(No Model.)
G. W. GRIFFIN.
BAND SAW MACHINE FOR CUTTING METAL, &c.
No. 502,887. Patented Aug. 8, 1893.
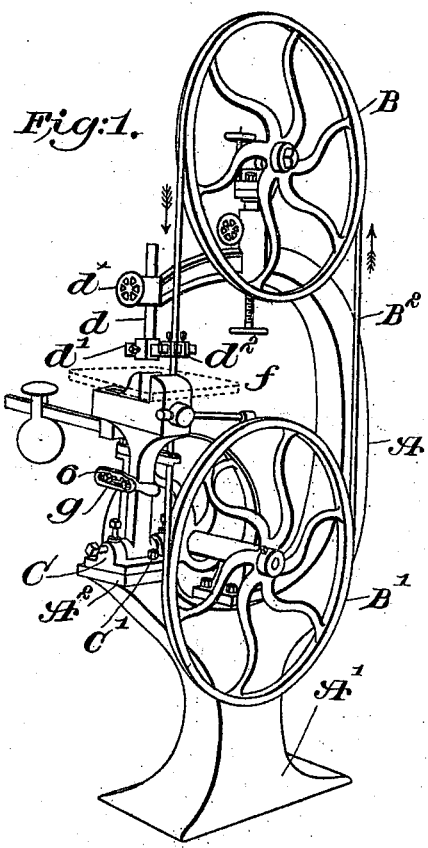
Fig. 1.
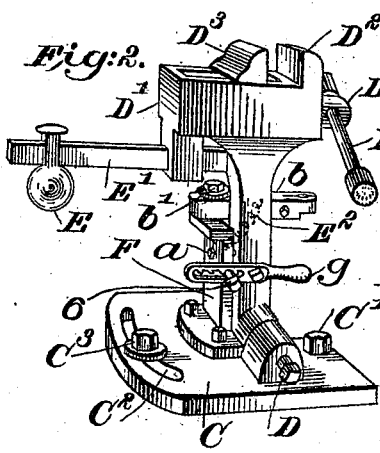
Fig. 2.
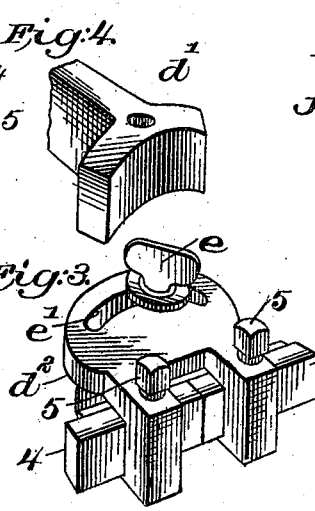
Fig. 3.
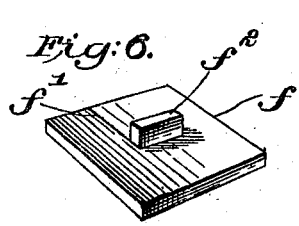
Fig. 4.
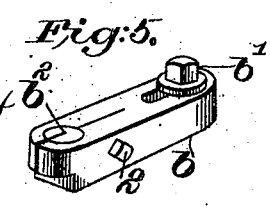
Fig. 5.
Fig. 6.
Witnesses.
Inventor.
George W. Griffin.
by Crosby & Gregory
Attys.

UNITED STATES PATENT OFFICE.

GEORGE W. GRIFFIN, OF FRANKLIN, NEW HAMPSHIRE.

BAND-SAW MACHINE FOR CUTTING METAL, &c.

SPECIFICATION forming part of Letters Patent No. 502,887, dated August 8, 1893.

Application filed October 13, 1892. Serial No. 448,732. (No model.)

*To all whom it may concern:*

Be it known that I, GEORGE W. GRIFFIN, of Franklin, county of Merrimac, State of New Hampshire, have invented an Improvement in Band-Saw Machines for Cutting Metal, &c., of which the following description, in connection with the accompanying drawings, is a specification, like letters and figures on the drawings representing like parts.

The machine herein to be described has been devised more especially for cutting metal either in rod or flat shape, but it is, it will be obvious, applicable for cutting other substances than metal.

Heretofore metal rods and bars have been cut transversely by power-actuated hack saws, but that class of machine is not as economical to run both as to wear of parts and speed of production as a band saw, hence my efforts are directed to the employment of a band saw for this class of work.

In carrying out my invention I have devised a work-holder the base of which is a vise, and have combined it operatively with the band saw in such manner that the vise, while holding the work to be cut, is also made to feed the work against the teeth of the saw, and by the employment of this vise I have been enabled to, as it were, greatly increase the value of my improved machine, for the vise may be made to hold a table or work-plate having a suitable saw throat on which the work to be cut may be laid or supported during the operation of the saw. When the table is used the vise is clamped so that its feeding movement before alluded to is suspended.

In order that the cut made to sever a bar or rod may be at right angles to its length, I have combined with the band saw and vise adjustable saw guides located both above and below the vise, the said saw guides temporarily twisting the band saw so that its line of cut may be under the control of the operator and a right angle cut may be made even when the bar is long enough to extend beyond the back run of the saw or that part of the saw opposite where its teeth cut.

Figure 1, in perspective shows a band saw machine embodying my invention, the work-plate to be hereinafter described being represented by dotted lines it being considered as transparent, such illustration of the table saving multiplication of figures upon the drawings; Fig. 2, on a larger scale represents the vise for holding the table. Fig. 3, is a detail of the upper saw guide; Fig. 4, a detail of the underlying piece shown in Fig. 3. Fig. 5, is a detail of the lower guide for the band saw; Fig. 6, an inverted view of the table detached.

The frame-work A of the band saw, standing upon a foot $A'$; the saw supporting wheels $B$, $B'$; the band saw $B^2$, and the devices for supporting the said wheels and adjusting them are and may be of any usual shape and material. The frame-work has a projection $A^2$ upon which I have adjustably mounted the foot plate C, the pivot $C'$ of the foot plate being a vertical one and being arranged as nearly as possible in the vertical plane in which the cutting edge of the saw travels. This foot plate is slotted, as at $C^2$, to receive a clamp screw $C^3$ to hold the foot plate in its adjusted position, it being made adjustable on the frame-work so that it may be turned more or less about the pivot $C'$ in order that when a long bar is being sawed off, the end of the bar remote from the vise may extend beyond the back run of the saw. This foot plate has pivoted upon it at D the shank of a vise $D'$ having preferably a fixed jaw $D^2$ and a movable jaw $D^3$, the latter being made adjustable in any usual or suitable manner either by screw as $D^4$ and handle $D^5$, or by any usual approved device. This vise is pivoted as described in order that it may be acted upon in suitable manner to normally bear the work held by it against the cutting edge of the saw, and to do this I have in this present embodiment of my invention shown the vise as having adjustably mounted upon it a weight E, the said weight riding upon an arm $E'$, but it is obvious that this device which normally acts upon the vise to give it a feeding movement such as stated, may be greatly varied without departing from my invention and may be even in the form of a spring, as indicated by dotted lines at $E^2$, but the construction embodying an arm and weight is considered preferable. The foot plate C has erected upon it a stand F provided with a regulating screw or stop $a$ to determine the extent of the feeding movement of the vise. Upon the top of this stand I have adjustably mounted a saw-guide $b$, it being movable about the pivot C' with the vise and being clamped in position by a clamp screw $b'$. This guide contains a slotted steel plug $b^2$ which is clamped firmly in place by a suitable clamp screw 2 extended through the split end of the guide, the saw traveling on the slot of the plug.

The upper end of the frame-work has a proper bearing for the reception of a rod $d$ which may be adjusted vertically in such bearing and be held in any adjusted position by a suitable screw $d^\times$. The rod $d$ at its lower end has a socket or box which receives a bar $d'$ one end of which is represented as in the form of a segment, see Fig. 4, said bar supporting the saw-guide $d^2$, the saw-guide having contact blocks 4, 4, which may be clamped in adjusted position by screws 5, said blocks contacting with the opposite sides of the band saw. The connection between the bar $d'$ and the saw-guide $d^2$ is made by a clamp screw or device $e$ in a slot $e'$, and the construction of the bar and the saw-guide is such that the latter may be adjusted or moved in an arc of a horizontal circle in order that the blocks 4 between the ends of which the saw travels in its front run may be more or less twisted out of the plane occupied by the faces of the saw-carrying wheels B and B' in order that the cut made by the saw may be at right angles with the bar or rod held in the vise whatever may be the position of the vise, for it will be understood that with a long bar or rod, the vise has to be adjusted so that one end of the bar may when desired extend beyond the back run of the band.

The vise may be used to hold any rod or bar to be cut, or any device which may be capable of being clamped between the vise jaws.

There is a large amount of work to be done in a machine shop wherein the metal to be cut can be best manipulated while lying upon a flat surface, and to adapt my machine also for this large variety of work, I have devised a table $f$, shown separately in Fig. 6, said table having a suitable throat, as $f'$, for the band saw, and having at its under side a suitable lug or block, as $f^2$, to be grasped between the jaws of the vise.

In Fig. 1, I have by dotted lines represented the table $f$ in place, it being supposed to be transparent so as to show distinctly the parts below it. When the table is used it becomes desirable to prevent the tipping motion of the vise about its center D, and to do this I have provided a suitable locking device, herein represented as a slotted lever $g$, pivoted upon the shank of the vise, the slotted part of the lever having suitable notches to engage, when desired, a pin or projection 6 extended from the stand F. When the table is not used on the vise, the locking device $g$ will be turned so that the pin 6 will contact with the smooth edge of the slot in the lever, but when the table is to be used the operator will turn the locking device and cause one of its teeth or projections to engage the pin 6, the connection of the locking device and vise being preferably with such friction that the locking device will remain in the position in which it is put by the operator.

Having described my invention, what I claim as new, and desire to secure by Letters Patent, is—

1. The combination with a band saw and actuating mechanism therefor, and guides to turn the band saw out of the plane tangent to the wheels supporting said band saw; of a vise to hold or support the work to be acted upon by the saw, said vise being adapted to turn in a horizontal plane, substantially as described.

2. The combination with a band saw and its actuating devices, of a loosely mounted vise, and means to move the same automatically against the teeth of the band saw to effect the feeding of the work being sawed, substantially as described.

3. The combination with a band saw and actuating devices therefor, of a vise adapted to turn about a horizontal pivot and mounted upon a foot plate adapted to turn about a vertical pivot, substantially as described.

4. A band saw and its actuating wheels, and a vise supported upon a vertical pivot C' and adapted to be rotated in a horizontal plane as described, combined with a band saw guide which may be turned in a horizontal plane to thus twist or turn the band saw out of the plane tangent to the face of the wheels about which the band saw travels, whereby the line of cut of the band saw may be adapted to the angle of presentation of the work by the vise to thus insure a right angled cut through a bar or rod, substantially as described.

5. The combination with a band saw and its actuating devices, of a vise adapted to turn about a horizontal and a vertical pivot, and a removable table held by it, the said table being provided with a throat to receive the band saw, to operate, substantially as described.

In testimony whereof I have signed my name to this specification in the presence of two subscribing witnesses.

GEORGE W. GRIFFIN.

Witnesses:
GEO. W. GREGORY,
M. J. SHERIDAN.